United States Patent [19]

Sada et al.

[11] 4,296,644

[45] Oct. 27, 1981

[54] CASING FOR A TRANSMISSION

[75] Inventors: Kenzo Sada; Shigeyuki Hayashi, both of Sakai, Japan

[73] Assignee: Kubota, Ltd., Osaka, Japan

[21] Appl. No.: 27,341

[22] Filed: Apr. 5, 1979

[30] Foreign Application Priority Data

Aug. 10, 1978 [JP] Japan ................... 53-110967[U]

[51] Int. Cl.³ ........................................... F16H 57/02
[52] U.S. Cl. ................................. 74/606 R; 74/15.66; 74/340
[58] Field of Search ................. 74/606 R, 15.66, 340, 74/606 A; 64/3

[56] References Cited

U.S. PATENT DOCUMENTS

| | | | |
|---|---|---|---|
| 1,431,721 | 10/1922 | Burns | 74/606 |
| 1,974,803 | 9/1934 | Chilton | 64/3 |
| 2,231,465 | 2/1941 | Emrick | 74/606 |
| 2,899,034 | 8/1959 | Hubert | 74/15.66 |
| 3,802,289 | 4/1944 | Cheek | 74/606 |

*Primary Examiner*—Kenneth Dorner
*Attorney, Agent, or Firm*—Jordan and Hamburg

[57] ABSTRACT

A transmission comprises a first transmission case, a second transmission case connected to the case, a transmission shaft extending through the connection between the two cases, a tubular member fitting to and provided between the two cases at the position where the shaft extends through the cases, the tubular member having the shaft extending therethrough, and oil seals provided between the outer periphery of the tubular member and the two cases.

10 Claims, 3 Drawing Figures

CASING FOR A TRANSMISSION

BACKGROUND OF THE INVENTION

The present invention relates to a transmission comprising a first transmission case and a second transmission case connected together with a transmission shaft extending through the connected portions.

The first and second transmission cases contain oil for lubricating the transmission mechanisms, such as gear mechanisms, housed in the cases and must therefore be sealed off to confine the lubricating oil therein. Since the two cases are usually connected together over the entire opposed wall surfaces of the cases with a packing or the like interposed therebetween, the following problems have heretofore been encountered.

If it is attempted to connect the first and second transmission cases together over the entire wall surfaces, the cases will not be properly intimately fittable unless the wall surfaces are finished with high accuracy. Thus the cases require much labor to make. Additionally the two transmission cases are cumbersome to assemble because they must be fastened to each other uniformly over the entire opposed wall surfaces.

SUMMARY OF THE INVENTION

An object of this invention is to overcome the above problems.

To fulfil this object, the present invention provides a transmission comprising a first transmission case, a second transmission case connected to the first transmission case, at least one transmission shaft extending through the connected portions of the two cases, a tubular member fitting to, and provided between, the two cases at the position where the transmission shaft extends through the cases, the tubular member having the transmission shaft extending therethrough, and oil seals provided between the outer periphery of the tubular member and the two cases.

Thus the two transmission cases are assembled with the use of a tubular member and are sealed off by oil seals provided between the outer periphery of the tubular member and the two cases, so that the portions which must be finished with high accuracy are limited only to the outer periphery of the tubular member and the surfaces of the cases to which the tubular member is to be fitted. The parts are therefore easier to make than the conventional transmission cases which need to be accurately finished over the entire opposed wall surfaces. There is another advantage in that the cases of this invention, unlike the conventional structure, can be properly sealed off even when they are not fitted together with high accuracy. This assures an easy assembling procedure.

Other objects and advantages of this invention will become apparent from the following description.

DESCRIPTION OF THE PREFERRED EMBODIMENT

Figure 1:
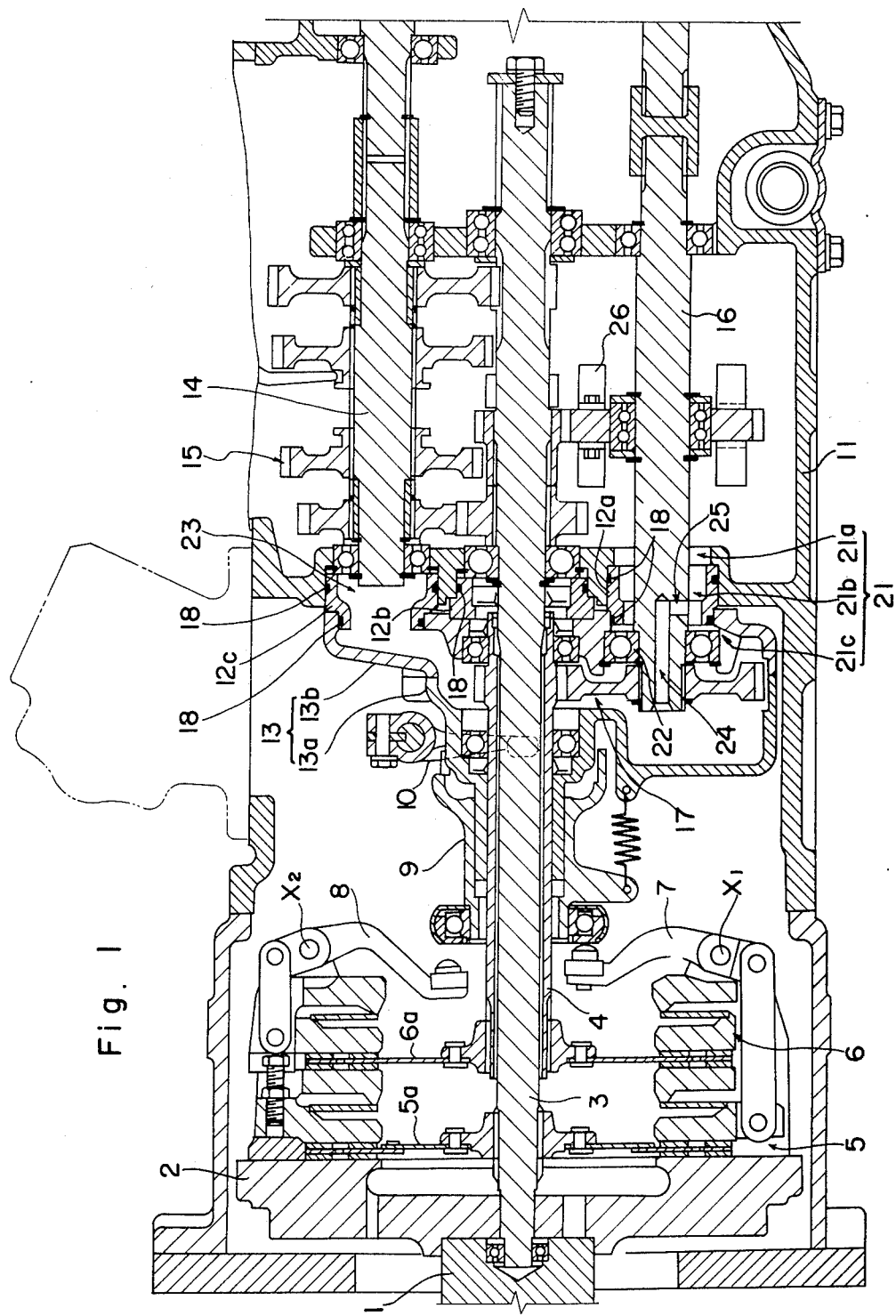
FIG. 1 is a side elevation in vertical section showing a transmission embodying the present invention.

With reference to FIG. 1 showing a transmission for farm tractors, indicated at 1 is an engine output shaft, at 2 a flywheel fixed to the output shaft, at 3 a running system input shaft, at 4 a tubular PTO input shaft fitted around the input shaft 3 and rotatable relative thereto, at 11 a large first transmission case and at 13 a small second transmission case connected to the front of the case 11.

Friction plates 5a and 6a are splined to the running system input shaft 3 and to the PTO input shaft 4 respectively and elastically biased toward the flywheel 2 to provide a clutch 5 for the running system and a clutch 6 for the PTO system. These clutches 5 and 6 are disengaged when operating arms 7 and 8 pivotably connected to the flywheel 2 are pushed axially thereof and thereby turned about support points $X_1$ and $X_2$ respectively. One end of a cylindrical member 9 fitting around the second transmission case 13 is adapted for contact with the operating arms 7 and 8. When the clutches 5 and 6 are in their engaged state, the one end of the cylindrical member 9 is spaced apart from the operating arm 7 of the running system clutch 5 by a smaller distance than from the operating arm 8 of the PTO clutch 6, such that the cylindrical member 9, when shifted by a shift fork 10 in engagement therewith, pivotally moves the operating arm 7 first to disengage the running system clutch 5 and subsequently turns the operating arm 8 to disengage the PTO clutch 6. The shift fork 10 is pivotally moved by the action of an unillustrated pedal.

The running system input shaft 3 extends through the second transmission case 13 into the first transmission case 11 and is adapted to transmit power via a gear speed change mechanism 15 to a running system transmission shaft 14 supported by an upper portion of the first transmission case 11.

The PTO input shaft 4 extends into the second transmission case 13 and is adapted to transmit power through a gear coupling mechanism 17 to one end of a PTO transmission shaft 16 extending from the interior of the first transmission case 13 into the second transmission case 13.

The first and second transmission cases 11 and 13 contain in the interior lubricating oil for lubricating the transmitting mechanisms housed in the two cases 11 and 13. These cases are connected together liquid-tightly to confine the lubricating oil therein against any leak.

Figure 2:
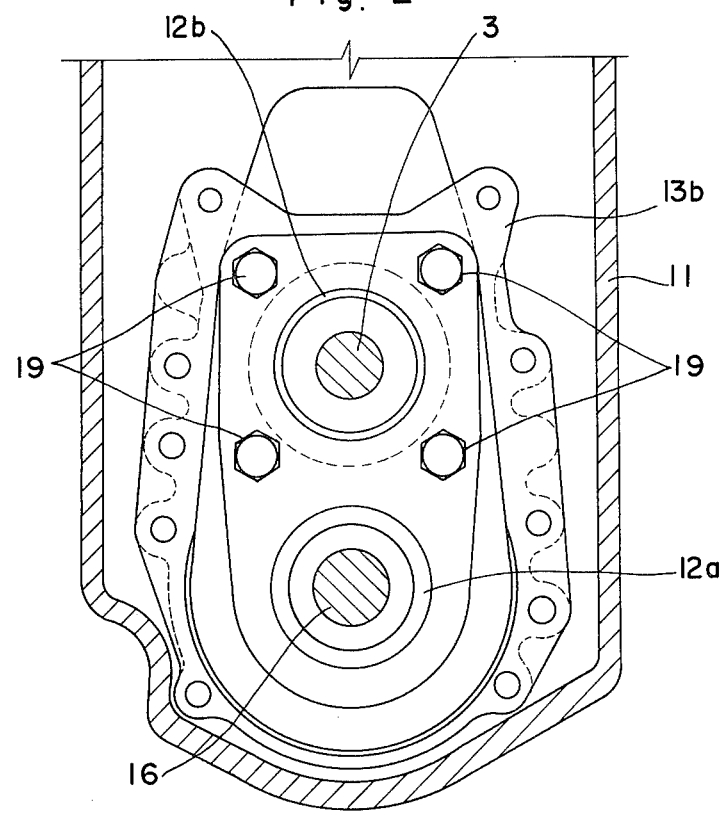
FIG. 2 is a front view showing the rear case segment of a second transmission case.
Figure 3:
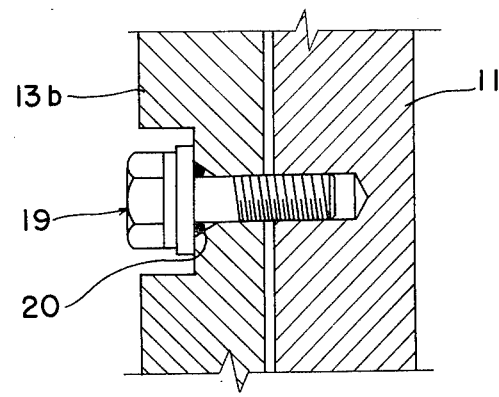
FIG. 3 is a side elevation in vertical section showing part of the rear case segment as fastened to a first transmission case by a bolt.

More specifically stated, the second transmission case 13 is made up of two divided portions, namely a front case segment 13a and a rear case segment 13b, which are fastened together by bolts (see FIG. 2). Before assemblage, the rear case segment 13b is fastened to the first transmission case 11 first, and the front case segment 13a is attached to the rear case segment 13b. Held between the first transmission case 11 and the rear case segment 13b fastened to the front wall of the case 11 by bolts 19 are a lower tubular member 12a having the PTO transmission shaft 16 extending therethrough, an intermediate tubular member 12b having the running system input shaft 3 extending therethrough, and an upper tubular member 12c positioned in front of the running system transmission shaft 14. These tubular members 12a, 12b and 12c are fitted to the first transmission case 11 and to the rear case segment 13b with O-rings 18 provided between the outer peripheries of the tubular portions 12a, 12b and 12c and each of the cases 11 and 13a. The O-rings serve as oil seals. Each of the bolts 19 for fastening the rear case segment 13b to the first transmission case 11 is provided with an intervening O-ring 20 to preclude the leak of the oil through the bolt hole as seen in FIG. 3.

The lubricating oil within the first transmission case 11 is led into the second transmission case 13 through an oil channel 21 comprising a clearance 21a between the first transmission case 11 and the outer periphery of the PTO transmission shaft 16, another clearance 21b between the tubular member 12a and the PTO transmission shaft 16, and a cutout groove 21c formed in the part of the second transmission case 13 opposed to an outer peripheral portion of a bearing 22 fitted to the case 13 for supporting the PTO transmission shaft 16. The interior of the upper tubular member 12c serves as an air channel 23 for guiding air from the interior of the second transmission case 13 into the first transmission case 11 with the inflow of the lubricant. The PTO transmission shaft 16 is formed with a first passage 24 extending axially thereof from one end of the shaft 16 within the second transmission case 13 to a portion of the shaft 16 positioned within the first transmission case 11, and with a second passage 25 communicating with the portion of the first passage 24 positioned within the first transmission case 11 and extending to the outer periphery of the shaft 16 radially thereof. With the rotation of the transmission shaft 16, the lubricating oil within the second passage 25 is centrifugally released therefrom so that the lubricating oil will be forcibly withdrawn from the second transmission case 13 and returned to the case 11 by way of the first and second passages 24 and 25. The withdrawing and returning action thus effected serves to reduce the likelihood that the lubricant within the second transmission case 13 will become degraded early because it is in a small quantity.

Indicated at 26 in FIG. 1 is a rotatable blade wheel loosely mounted on the PTO transmission shaft 16 and coupled to the running system input shaft 3 by gears. The blade wheel 26 acts against the rotation of the input shaft 3 with the resistance given by the lubricating oil so as to stop the rotation of the input shaft 3 rapidly when the running system clutch 5 is disengaged.

Although oil seals are provided in the illustrated embodiment between the inner periphery of the intermediate tubular portion 12b and the outer periphery of the running system input shaft 3 and between the outer periphery of the PTO input shaft 4 and the second transmission case 13, with no oil seal provided between the outer periphery of the intermediate tubular portion 12b and the second transmission case 13, an oil seal may be installed in this portion.

We claim:

1. A transmission comprising:
   a first transmission case;
   a second transmission case connected to the first transmission case;
   at least one transmission shaft extending through the connection between the first and second transmission cases;
   a first tubular member fitted between the first transmission case and the second transmission case at the position where the transmission shaft extends through the first and second transmission cases with the transmission shaft extending through the tubular member;
   oil seals between the outer periphery of the first tubular member and the first and second transmission cases;
   a running system input shaft extending through the connection between the first and second transmission cases;
   a second tubular member fitted between the first transmission case and the second transmission case at the position where the input shaft extends through the first and second transmission cases, the second tubular member having the input shaft extending therethrough, and, oil seals between the outer periphery of the second tubular member and the first and second transmission cases.

2. A transmission as defined in claim 1 further comprising:
   a third tubular member fitted between the first transmission case and the second transmission case; and
   oil seals provided between the outer periphery of the third tubular member and the first and second transmission cases.

3. A transmission as defined in claim 1 wherein the first tubular member is disposed at lower portions of the first and second transmission cases and forms an oil channel permitting the first and second transmission cases to communicate with each other.

4. A transmission as defined in claim 3 wherein the oil channel comprises clearance between the first transmission case and the outer periphery of the transmission shaft, a clearance between the first tubular member and the transmission shaft, and a cutout groove formed in the portion of the second transmission case supporting the transmission shaft.

5. A transmission as defined in claim 2 wherein the third tubular member is disposed at upper portions of the first and second transmission cases and forms an air channel for keeping the first and second transmission cases in the communication with each other.

6. A transmission as defined in claim 5 wherein the transmission shaft is formed with a first passage extending axially thereof from one end of the transmission shaft within the second transmission case to a portion of the transmission shaft positioned within the first transmission case and with a second passage communicating with the portion of the first passage positioned within the first transmission case and opened to the outer periphery of the transmission shaft, the opening of the second passage being open to the clearance between the first tubular member and the transmission shaft.

7. A casing for a transmission comprising:
   a first transmission case having a running system transmission shaft, a running system input shaft mounted below the transmission shaft, and a PTO transmission shaft mounted below the input shaft;
   a second transmission case connected to a forward portion of the first transmission case, said input shaft extending forwardly through the second transmission case and operatively connected to a running system clutch, said PTO transmission shaft having a forward end thereof located in the second transmission case;
   a tubular PTO input shaft relatively rotatably fitted on said running system input shaft and operatively connected at a forward end thereof to a PTO system clutch, a rearward end of said PTO input shaft being located in the second transmission case;

a gear coupling mechanism mounted in the second transmission case to operatively connect said PTO input shaft and said PTO transmission shaft;

a lower tubular member fitted between the first transmission case and the second transmission case at a position where the PTO transmission shaft extends through the cases, the PTO transmission shaft extending through said lower tubular member;

an oil channel between the lower tubular member and the PTO transmission shaft to provide communication between the first and second transmission cases;

an upper tubular member fitted between the first transmission case and the second transmission case at a position where the running system transmission shaft is supported, said upper tubular member defining an air channel to communicate between the first and second transmission cases; and oil seals respectively interposed between an outer periphery of the lower tubular member and the first and second transmission cases and between an outer periphery of the upper tubular member and the first and second transmission cases whereby the first and second transmission cases are interconnected in oiltight condition.

8. A casing for a transmission as defined in claim 7 further comprising an intermediate tubular member fitted between the first transmission case and the second transmission case at a position where the running system input shaft extends through the cases, the running system input shaft extending through said intermediate tubular member.

9. A casing for a transmission as defined in claims 7 or 8 further comprising:

a first passage in said PTO transmission shaft extending from the forward end of the PTO transmission shaft to a portion thereof lying in the first transmission case, and a second passage in said PTO transmission shaft communicating with said first passage at a position thereof lying in the first transmission case and opening into an outer periphery of the PTO transmission shaft.

10. A casing for a transmission as defined in claims 7 or 8, wherein said oil channel comprises a clearance between the first transmission case and the outer periphery of the PTO transmission shaft, a clearance between the lower tubular member and the outer periphery of the PTO transmission shaft, and a cutout groove in the second transmission case.

* * * * *